US009516060B2

(12) United States Patent
Yu et al.

(10) Patent No.: US 9,516,060 B2
(45) Date of Patent: *Dec. 6, 2016

(54) MALWARE ANALYSIS METHODS AND SYSTEMS

(71) Applicant: Bank of America Corporation, Charlotte, NC (US)

(72) Inventors: Sounil Yu, Reston, VA (US); Christopher Schafer, Agoura Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,217

(22) Filed: Oct. 5, 2015

(65) Prior Publication Data

US 2016/0028768 A1 Jan. 28, 2016

Related U.S. Application Data

(63) Continuation of application No. 14/014,970, filed on Aug. 30, 2013, now Pat. No. 9,185,128.

(51) Int. Cl.
*H04L 29/06* (2006.01)
*G06F 21/56* (2013.01)

(52) U.S. Cl.
CPC .......... *H04L 63/1491* (2013.01); *G06F 21/56* (2013.01); *G06F 21/566* (2013.01); *H04L 63/145* (2013.01); *H04L 63/1441* (2013.01); *H04L 29/06* (2013.01)

(58) Field of Classification Search
USPC .............. 726/22–26; 713/188–189, 193–194
See application file for complete search history.

(56) References Cited

U.S. PATENT DOCUMENTS

| | | | |
|---|---|---|---|
| 2004/0221194 A1* | 11/2004 | Denninghoff | G06F 9/4406 714/11 |
| 2009/0007100 A1 | 1/2009 | Field et al. | |
| 2011/0047618 A1* | 2/2011 | Evans | G06F 21/566 726/23 |
| 2011/0185223 A1 | 7/2011 | Kleinman et al. | |
| 2012/0303971 A1 | 11/2012 | Palka et al. | |
| 2012/0304244 A1* | 11/2012 | Xie | G06F 21/00 726/1 |

* cited by examiner

*Primary Examiner* — Samuel Ambaye
(74) *Attorney, Agent, or Firm* — Banner & Witcoff, Ltd.; Michael A. Springs

(57) ABSTRACT

Methods of analyzing malware and other suspicious files are presented, where some embodiments include analyzing the behavior of a first malware sample on both a virtual machine and a physical computing device, the physical device having been booted from a secondary boot source, and determining whether the behavior of the malware sample was different on the virtual machine and the physical computing device. In certain embodiments, a notification indicating that the behavior was different may be generated. In other embodiments, a malware analysis computing device that is configured to receive a base hard drive image may be network booted, and the behavior of the malware sample on the malware analysis computing device may be analyzed. In certain embodiments, a malware-infected hard drive image may then be copied off the malware analysis computing device.

20 Claims, 4 Drawing Sheets

MALWARE ANALYSIS METHODS AND SYSTEMS

This application is a continuation of U.S. patent application Ser. No. 14/014,970, entitled "Malware Analysis Methods and Systems" and filed on Aug. 30, 2013, which this application claims priority thereto and the benefit thereof, and the entire disclosure of which is hereby incorporated by reference.

BACKGROUND

Malicious software, i.e. "malware," presents a serious hazard to computer systems and devices. Once present on a computing system or device malware can, amongst other effects, appropriate personal, financial or otherwise sensitive information, and hinder or wholly prevent proper system performance. Despite efforts to block or remove malware from systems, such as the use of antivirus software programs, it is estimated that millions of computing systems are infected with some form of malware. The widespread presence of malware is due in part to the extent and diversity of malware variants. Indeed, malware can take the form of viruses, worms, Trojan horses, rootkits, keyloggers, spyware, adware, and ransomware, amongst others, and new types of each are being made constantly. In addition, many new malware variants are being constantly created, typically in increasing sophistication and complexity.

SUMMARY

The following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. The following summary merely presents some concepts of the present disclosure in a simplified form as a prelude to the more detailed description provided below.

Some aspects of the disclosure provide malware analysis techniques that can efficiently and effectively analyze malware samples. Some methods of malware analysis may utilize a "sandbox" concept, i.e. using an area where malware is intentionally installed in a secured or isolated environment designed to protect the same or other computing devices from any adverse effects of the malware. This type of analysis may, in some instances, be done in a virtual machine environment. More advanced malware variants, however, may be able to detect when they are in a virtual machine environment, or some other analyzation environment, and, accordingly, either take no action or take only benign actions while being analyzed. Therefore, these malware variants may escape classification as malware and only manifest their negative and adverse effects when in an actual, vulnerable environment. As discussed below, some aspects of the disclosure provide ways of detecting and analyzing these more advanced malware variants, even when such variants are designed to avoid detection in a virtual machine environment.

In accordance with some aspects, a method is provided. The method may include an administrative computing device initializing a virtual machine. Then, the administrative computing device may install a first malware sample onto the virtual machine. Subsequently, the administrative computing device may analyze the behavior of the first malware sample on the virtual machine. Afterward, the administrative computing device may cause a physical computing device to be booted from a secondary boot source different from a primary boot source, the primary boot source possibly being a hard disk on the physical computing device. Then, the administrative computing device may install the first malware sample onto the physical computing device. Afterwards, the administrative computing device may analyze the behavior of the first malware sample on the physical computing device. Then, the administrative computing device may determine, based on the analyzing, whether the behavior of the first malware sample on the virtual machine was different from the behavior of the first malware sample on the physical computing device. Successively, the administrative computing device may, responsive to determining that the behavior of the first malware sample on the virtual machine was different from the behavior of the first malware sample on the physical computing device, generate a notification indicating the first malware sample behaved differently.

In certain embodiments, the administrative computing device may, responsive to determining that the behavior of the first malware sample the virtual machine was different from the behavior of the first malware sample on the physical computing device, cause a malware analysis computing device to be booted from a network, wherein the malware analysis computing device may be configured to receive a base hard drive image from an image installation server when booted from the network. Then, the administrative computing device may cause the malware analysis computing device's access to the network to be blocked. Afterward the administrative computing device may cause the malware analysis computing device to be rebooted from the base hard drive image. In some embodiments, the administrative computing device may install the first malware sample onto the malware analysis computing device, and then analyze the behavior of the first malware sample on malware analysis computing device.

In certain embodiments, the administrative computing device may cause the malware analysis computing device's access to the network to be unblocked, and then the administrative computing device may copy a malware-infected hard drive image from the malware analysis computing device to an image collection server.

In various embodiments, the secondary boot source may be a LiveCD or a LiveUSB. In certain embodiments, the administrative computing device may cause user actions to be mimicked on the virtual machine and on the physical computing device after the first malware sample is installed. In various examples of embodiments, an automation script may be used to mimic user actions. In some embodiments, the user actions may be received from a remote user. In certain embodiments, the administrative computing device may restart the virtual machine, and may cause the physical computing device to be rebooted using an IP-enabled power strip, wherein the physical computing device may be configured to be rebooted from the secondary boot source.

In accordance with other aspects, a method is provided, the provided method example includes an administrative computing device initializing a virtual machine. Then the administrative computing device may install a first malware sample onto the virtual machine. The administrative computing device may then analyze the behavior of the first malware sample on the virtual machine. Subsequently, the administrative computing device may cause a physical computing to be booted from a secondary boot source different from a primary boot source, the primary boot source possibly being a hard disk on the physical computing device.

Afterward, the administrative computing device may install the first malware sample onto the physical computing device. Then, the administrative computing device may analyze the behavior of the first malware sample on the physical computing device. Successively, the administrative computing device may determine, based on the analyzing, whether the behavior of the first malware sample on the virtual machine was different from the behavior of the first malware sample on the physical computing device. Then, the administrative computing device may, responsive to determining that the behavior of the first malware sample on the virtual machine was different from the behavior of the first malware sample on the physical computing device, cause a malware analysis computing device to be booted from a network, wherein the malware analysis computing device may be configured to receive a base hard drive image from an image installation server when booted from the network. Subsequently, the administrative computing device may cause the malware analysis computing device's access to the network to be blocked. Then, the administrative computing device may cause the malware analysis computing device to be rebooted from the base hard drive image. Afterward, the administrative computing device may install the first malware sample onto the malware analysis computing device. Then the administrative computing device may analyze the behavior of the first malware sample on malware analysis computing device.

In various embodiments, the administrative computing device may cause the malware analysis computing device's access to the network to be unblocked. In certain embodiments the administrative computing device may copy a malware-infected hard drive image from the malware analysis computing device to an image collection server. In certain embodiments, the malware analysis computing device's access to the network may be blocked or unblocked by a managed switch.

In some embodiments, the method may include the administrative computing device causing user actions to be mimicked on the malware analysis computing device after the first malware sample is installed. In various embodiments an automation script may be used to mimic user actions. In certain embodiments, the user actions may be received from a remote user. In various embodiments, the secondary boot source may be a LiveCD or a LiveUSB.

In accordance with one or more additional aspects that provide examples of the method an administrative computing device may cause a physical computing device to be booted from a secondary boot source different from a primary boot source, where the primary boot source may be a hard disk on the physical computing device. Subsequently, the administrative computing device may install a first malware sample onto the physical computing device. The administrative computing device may analyze the behavior of the first malware sample on the physical computing device. Then, the administrative computing device may cause the physical computing device to be rebooted, and the physical computing device may be rebooted from the secondary boot source such that it may be ready for subsequent malware analysis.

In various embodiments, the physical computing device may be rebooted using an IP-enabled power strip. In certain embodiments, the administrative computing device may cause user actions to be mimicked on the physical computing device after the first malware sample is installed. In various embodiments, an automation script may be used to mimic user actions. In some embodiments, the user actions may be received from a remote user.

In accordance with additional aspects, one or more apparatuses, which may include one or more processors and/or memories, may be configured to perform one or more steps of methods discussed above. In accordance with other additional aspects, one or more non-transitory computer-readable media are provided, the media storing computer-readable instructions that, when executed by at least one computing device, may cause the at least one computing device to perform one or more steps of the methods discussed above.

These summary descriptions are merely provide examples of the methods and/or method steps that may be performed in one or more embodiments. In certain embodiments, the methods, apparatuses, and non-transitory computer-readable media include additional combinations or substitutions. Moreover, any of the features discussed in the embodiments of one aspect may be features of embodiments of any other aspect discussed herein. Finally, additional and alternative suitable variations, features, aspects and steps will be recognized by those skilled in the art given the benefit of this disclosure.

BRIEF DESCRIPTION OF THE DRAWINGS

Embodiments providing examples of the disclosure will now be described by way of example only and with reference to the accompanying drawings, in which.

DETAILED DESCRIPTION OF EMBODIMENTS

The embodiments described herein provide methods, apparatuses, and one or more non-transitory computer-readable media. In accordance to some aspects, the methods, apparatuses, and one or more non-transitory computer-readable media relate to techniques for analyzing malware or other suspicious files. These and other aspects, features and advantages of certain embodiments will be further understood by those skilled in the art from the following description of embodiments, which provide examples of the methods and/or methods steps that may be performed in some embodiments. In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Various aspects described herein may be embodied as a method, a data processing system, and/or a computer program product. Accordingly, those aspects may take the form of an entirely hardware embodiment, an entirely software embodiment and/or an embodiment combining software and hardware aspects. Furthermore, such aspects may take the form of a computer program product stored by one or more non-transitory computer-readable storage media having computer-readable program code, or instructions, embodied in or on the storage media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of tangible and/or non-transitory computer readable storage media such as hard disks, CD-ROMs, optical storage devices, magnetic storage devices, and/or any combination thereof.

Aspects of the method steps disclosed herein may be executed on one or more processors on a computing device 101. Such processors may execute computer-executable instructions stored on non-transitory computer-readable media. The disclosure may also be practiced in distributed computing environments where tasks are performed by remote processing devices that are linked through a communications network. In a distributed computing environment, program modules may be located in both local and remote computer storage media including memory storage devices.

Figure 1:
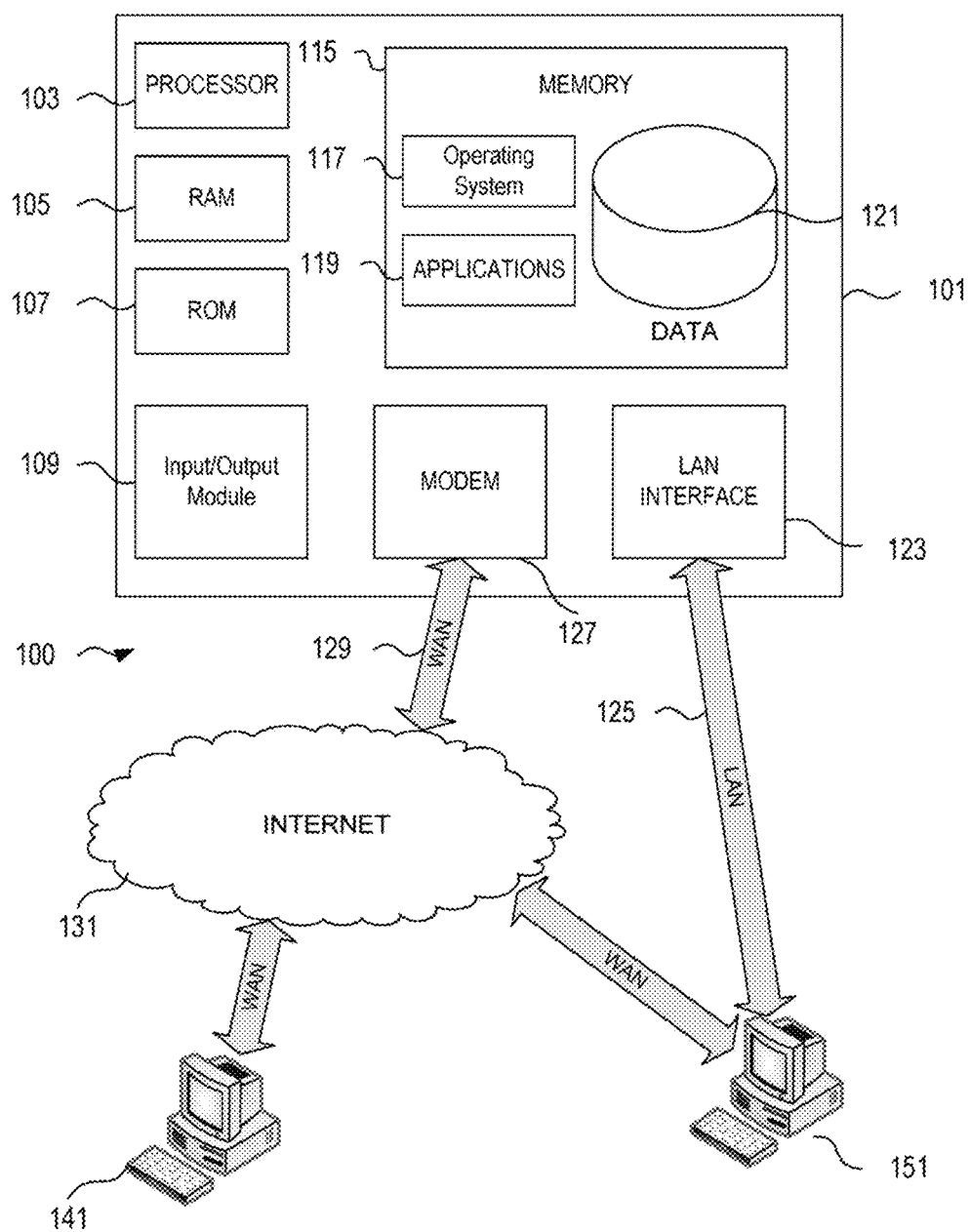
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computing device 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of computing device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The computing device 101 may operate in a networked environment supporting connections to one or more remote computers, such as terminals 141 and 151. The terminals 141 and 151 may be personal computers or servers that include many or all of the elements described above relative to the computing device 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, smartphones, multiprocessor systems, microprocessor-based systems, set top boxes, programmable consumer electronics, network PCs, minicomputers, mainframe computers, distributed computing environments that include any of the above systems or devices, and the like.

Figure 2:
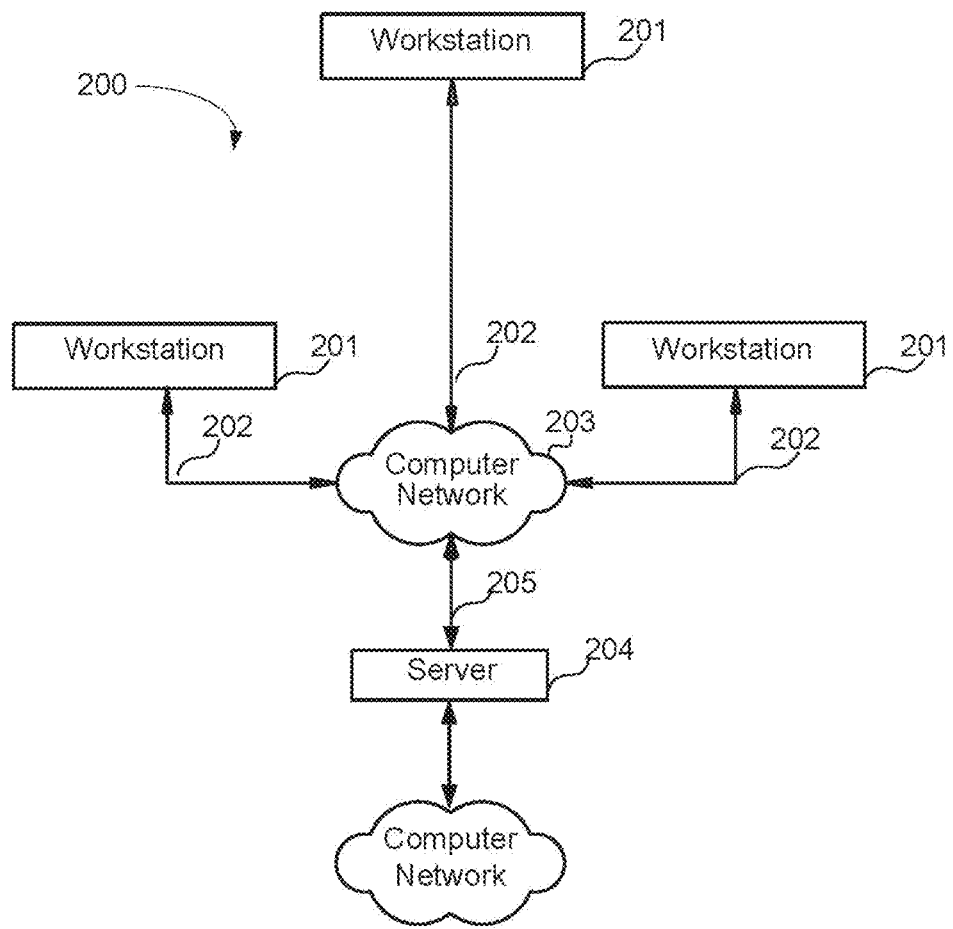
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

Figure 3:
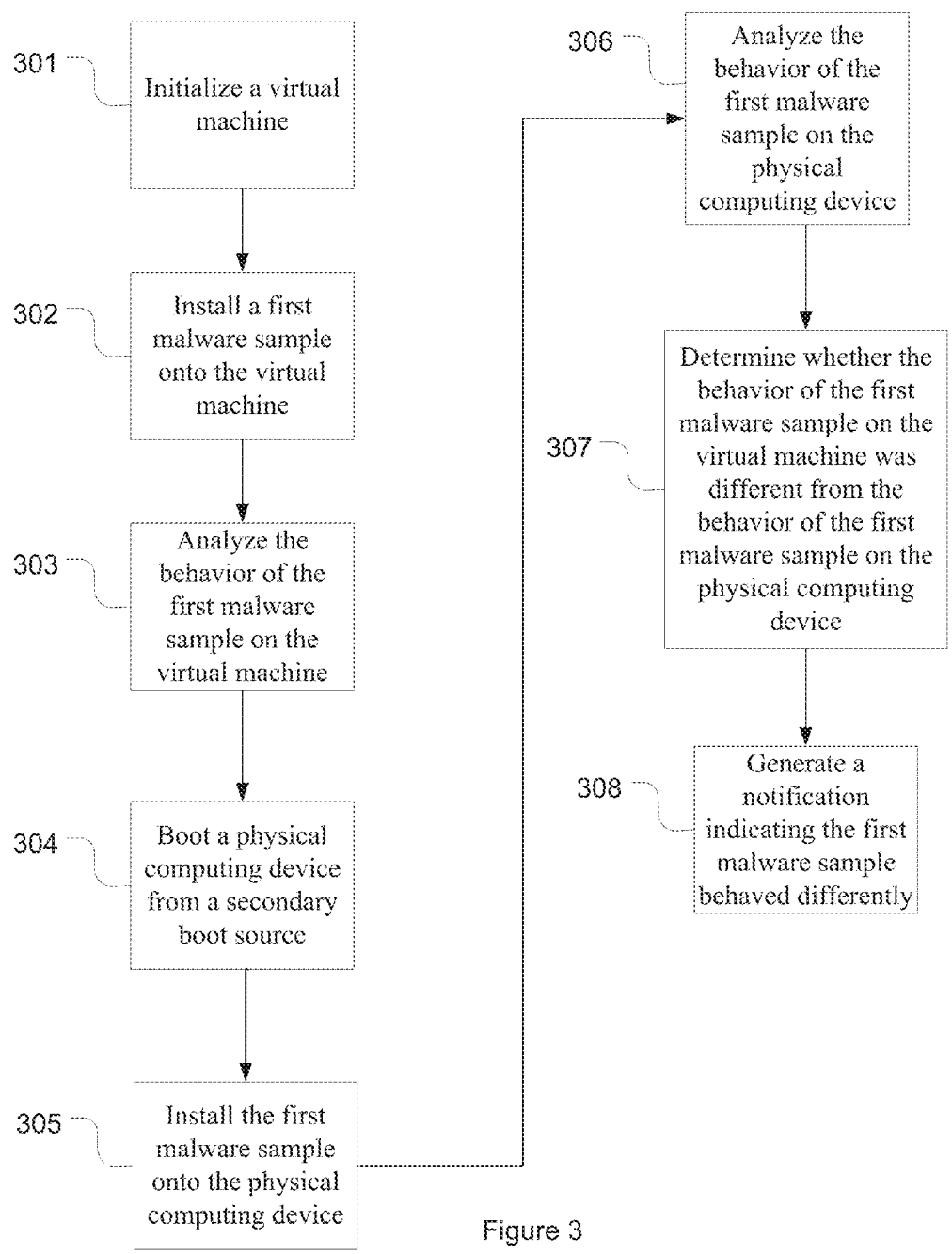
FIG. 3 is a flowchart of an example method in accordance with one or more embodiments.

In accordance with one aspect, methods are provided for analyzing malware or some other new and/or suspicious file. FIG. 3 shows a flowchart of an example embodiment of a method. In this example embodiment, amongst others discussed herein, the method steps may be performed by an administrative computing device, which may implement one or more aspects of computing device 101. In certain other embodiments, one or more steps may be performed by one or more additional computing devices, servers, and the like.

In the embodiment illustrated in FIG. 3, in step 301 a virtual machine may be initialized. For example, an administrative computing device may initialize a virtual machine by causing a remote computing device or server to initiate execution of virtual machine software. In various embodiments a system virtual machine may be initialized, while in others a process virtual machine may be initialized. In certain embodiments, the virtual machine may be configured to resemble a typical computing device, e.g. utilizing a commonly used operating system, having popular software programs, and the like. In step 302, the administrative computing device computing device may install a malware sample (or some other new or suspicious file) onto the virtual machine. Once the malware sample is present on the virtual machine, in step 303 its behavior may be analyzed by the administrative computing device. For example, in some embodiments the behavior analysis can include observing any processes initiated by the malware sample, tracking any new files created by the malware sample (such as, but not limited to, registry keys), observing any modifications to existing files, monitoring any other potentially malicious activities, or a combination thereof.

In this embodiment, after the administrative computing device has analyzed the behavior of the malware sample on the virtual machine, in step 304 the administrative computing device causes a physical computing device to boot from a secondary boot source. In various embodiments, the secondary boot source includes any boot source that is different from the hard disk on the physical computing device (i.e. the primary boot source of the computing device). In certain embodiments, the secondary boot source may be a LiveCD (e.g., a compact disc that includes a bootable image of an operating system, one or more applications, and/or other data) or a LiveUSB (e.g., a flash drive or external hard disk that includes a bootable image of an operating system, one or more applications, and/or other data). In some embodiments, the secondary boot source may be a write-locked source (e.g., the secondary boot source stores protected data that may be used in loading the operating system and/or applications, but the computing device and/or software running on the computing device, such as malware, cannot write data to the secondary boot source or modify the protected data). In this embodiment, once the physical computing device has been booted from the secondary boot source, in step 305 the administrative computing device installs the same malware sample analyzed on the virtual machine onto the physical computing device. Then, in step 306, the behavior of the malware sample on the physical computing device may be analyzed by the administrative computing device. As discussed below, by analyzing the behavior of the malware sample on the physical computing device, the administrative computing device may then be able to compare how the malware sample behaves on the physical computing device with how the malware sample behaves on the virtual machine.

In certain embodiments, such as the one illustrated in FIG. 3, the steps involving the virtual machine and steps involving the physical computing device may be run sequentially. In these embodiments, the administrative computing device, responsive to determining the presence of malware on the virtual machine while analyzing the malware sample on the virtual machine, may send a notification the malware has been detected, and/or may skip the remaining steps depicted in FIG. 3 in favor of different analysis actions, optionally including other analysis actions described herein, or other actions to prevent or minimize any adverse effects of the malware. In various embodiments, the steps involving the virtual machine and the physical computing device may be run in parallel or substantially in parallel.

In this embodiment, in step 307 the administrative computing device then determines, based on the analyzing of the malware behavior, whether the behavior of the first malware sample on the virtual machine was different from the behavior of the malware sample on the physical computing device. For example, the administrative computing device may determine whether the malware sample, e.g., attempted to access or successfully accessed different files or functionalities, wrote different data in different file locations (or even the same file locations), made different modifications to the same files, invoked different operating system application programming interface commands, sent or received different network data, and the like. In this manner, malware that is able to detect a virtual machine environment and accordingly act in a benign manner may advantageously be identified as a virtual-machine resistant malware variant when once analyzed on the physical computing device.

In step 308 of this embodiment, responsive to determining that the behavior of the malware sample on the virtual machine was different from the behavior of the malware sample on the physical computing device, the administrative computing device generates a notification indicating the malware sample behaved differently. In some embodiments, the administrative computing device generates and sends the notification, while in others additional components, such as another computing device or a server, sends the notification generated by the administrative computing device.

The content of the notification and its target can take many forms. For example, in some embodiments the notification may be sent to the user of the administrative computing device through the graphical user interface, or may be sent to a different computing device, is sent to a server such a command and control server, or may be sent directly to an IT employee or professional. In some embodiments, the notification may flag the malware sample for subsequent analysis by an IT employee or professional, whether on the physical computing device or otherwise.

In various embodiments, multiple different malware samples may be analyzed in sequence and the virtual machine and physical computing device components may be reset to their initial state for the analysis of each subsequent sample, or, if no additional samples are available at that time, the utilized components may be reset to their initial state so they may be ready for analysis of an additional malware sample when it arrives. For example, in certain embodiments, the administrative computing device restarts the virtual machine and causes the physical computing device to be rebooted from the secondary data source. In this manner, both the virtual machine and physical computing device may be quickly restored to an initial, non-malware infected state after analyzing a first malware sample so that each may be fully ready to properly analyze a second malware sample, and can again be restored to their initial state for analysis of any and all subsequent malware samples.

By booting the physical computing device from a secondary data source, such as a LiveCD, the need for time-consuming processes such as reinstalling a base image or "scrubbing" the effects of the malware may be eliminated. This advantageously allows the rapid recreation of a clean physical testing environment. Combined with the ability to restart the virtual machine, both analysis environments may be advantageously recreated quickly by the administrative computing device, and in certain embodiments may be done so automatically by the administrative computing device after analysis of a malware sample. In various embodiments, an IP-enabled power strip may be used to reboot the physical computing device. For example, an administrative computing device, subsequent to the analysis of a first malware sample, causes an IP-enabled power strip to stop supplying power to the physical computing device and, after an appropriate interval of time, causes the IP-enabled power strip to begin re-supplying power to the physical computing device, in turn causing it to reboot.

In various embodiments, user actions may be mimicked on the virtual machine, the physical computing device, or both, after the malware sample is installed. By mimicking actions indicative of actual use rather than a malware analysis environment, certain malware samples may exhibit their genuine, adverse behavior rather than a benign facade. This can further enhance the ability to detect and fully analyze malware in both the virtual machine environment and the physical computing device environment. In embodiments where the virtual machine environment and physical computing device environment analyze the malware sample sequentially, mimicking user actions can advantageously preserve resources and make the method more efficient by obviating the need to perform additional analysis on the physical computing device if the malware is detected in the virtual machine environment. For example, if the administrative computing device detects that malware is present in the virtual machine testing, the administrative computing device may determine to end the malware analysis process and forego any testing on the physical computing device.

In certain embodiments, an automation script may be used to mimic user actions. In some embodiments, user actions may be received from a remote user. In various embodiments the user actions may be received via remote desktop protocol or via virtual network computing. In some embodiments, the instructions may be received from a key, video, mouse ("KVM") switch. In these embodiments, the user actions may be advantageously received without utilizing additional software that may be detected by the malware sample and indicate to the malware that it is present in a malware analysis environment. Moreover, by actually receiving input signals, the mimicked user actions may be more likely to trigger adverse behavior by the malware sample by more closely resembling genuine use rather than use simulated by an analysis environment.

The user actions may be anything indicative of a genuine use of a computer. By way of example only, the mimicked user actions may include common actions such as mouse scrolling, mouse clicking, or keystroke entering. The mimicked user actions may be particular actions in relation to a particular program or type of file, such as scrolling down in a text document, changing the size of a visual image, or the like.

In some embodiments, the user actions may be mimicked as soon as the malware sample is installed, while in others the behavior of the malware sample may be analyzed for an appropriate period of time and, responsive to the computing device not detecting any behavior indicative of malware, the user actions may be mimicked in order to see if the actions will trigger any adverse behaviors of the malware.

Figure 4:
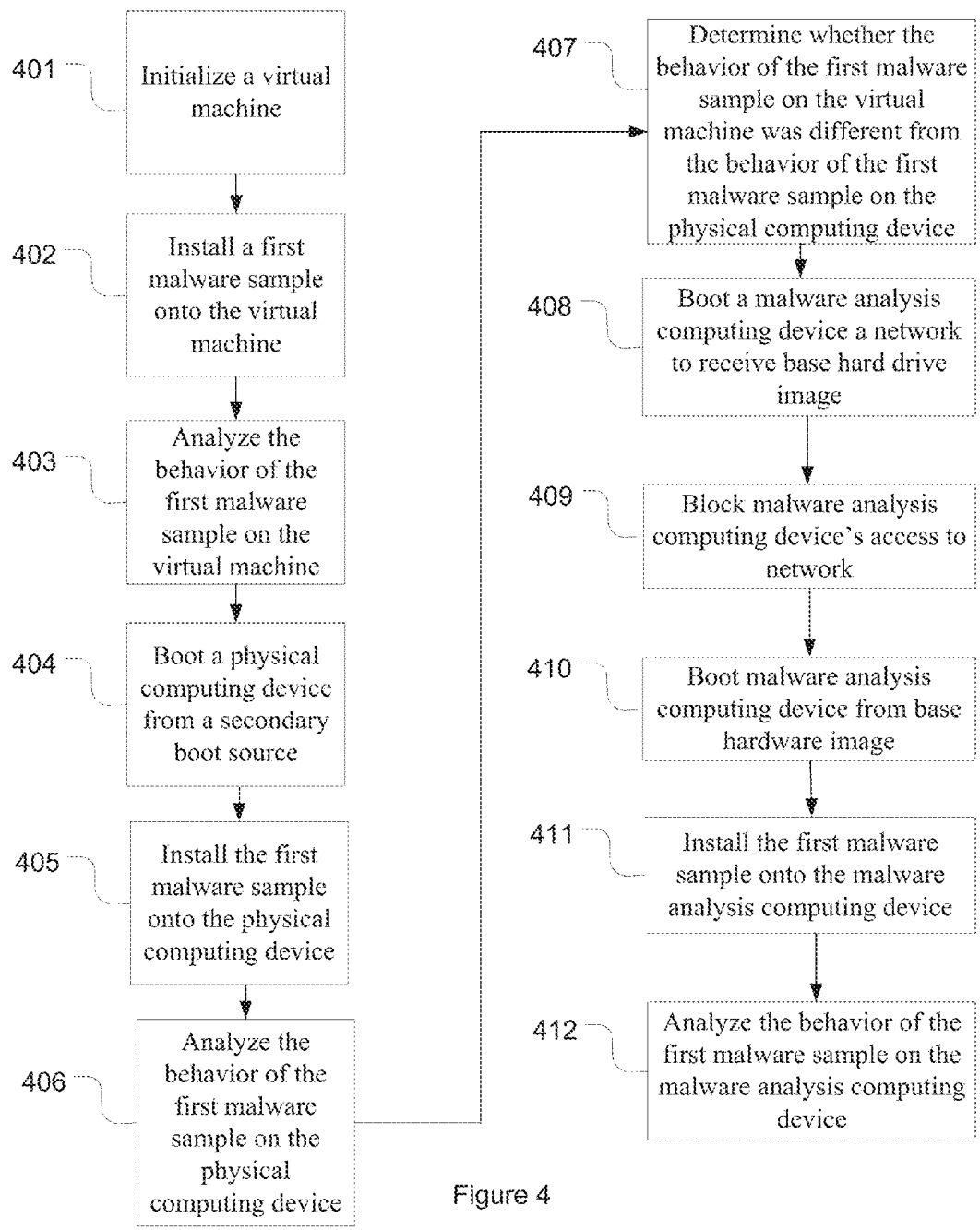
FIG. 4 is a flowchart of an example method in accordance with one or more embodiments.

In various embodiments, this aspect includes steps for additional malware analysis. For example, FIG. 4 shows an embodiment of an analysis method where steps 401-407 correspond to steps 301-307 described above, where an administrative computing device causes a malware sample to be analyzed on both a virtual machine and a physical computing device booted from a secondary source, and the behavior of the malware on each may be compared by the administrative computing device. In FIG. 4, however, rather than generating a notification responsive to determining the behavior was different (although this may be an optional step at any point after the determination is made, or alternatively whenever malware behavior is detected, such as after mimicked user actions) the administrative computing device causes additional analysis steps (which are discussed in greater detail below) to be performed. This can advantageously provide an automated method of comprehensive malware analysis that can, amongst other benefits, flag and analyze malware variants that resist analysis via virtual machines alone.

In the embodiment shown in FIG. 4, in step 408, responsive to determining that the behavior of the malware sample on the virtual machine was different from the behavior of the malware sample on the physical computing device, the administrative computing device causes a malware analysis computing device to be booted from a network, wherein the malware analysis computing device may be configured to receive a base hard drive image from an image installation server when booted from the network. In certain embodiments, multiple computing devices may be used for the malware analysis, (e.g. one non-administrative computing device acts as the physical computing device and another non-administrative computing device acts as the malware analysis device) while in others a single non-administrative computing device may be used as both the physical computing device and the malware analysis computing device (and even, optionally, may execute the virtual machine), wherein the preferred boot order of the non-administrative device may be altered by the administrative computing device to the appropriate booting preferences.

In this example, in step 409 the administrative computing device then causes the malware analysis computing device's access to the network to be blocked after the base hard drive image is received. In some embodiments, the malware analysis device's network access to any other component may be blocked, while in certain other embodiments the network access may be restricted (via the blocking) to a limited subset of a network designed for the testing of malware. In this embodiment example, the administrative computing device then causes the malware analysis computing device to be rebooted from the base hard drive image in step 410. In certain embodiments, this rebooting may be done using an IP-enabled power strip (e.g., by controlling the power supplied to the power strip, via the administrative computing device, to selectively cycle the power supplied to malware analysis computing device off and then on). In some examples, the boot order preferences of the malware analysis computing device have the device initially try to boot from the network and then, if this request times out, boot from its hard disc. In this particular example, when booting from a hard disc due to lack of network access, the boot will be from the installed base hard drive image.

In this manner, once rebooted, the malware analysis computing device may be free of malware and may fully resemble a genuine physical machine as utilized by a user, therefore minimizing the odds that malware variants will display only benign behavior. In certain embodiments, user actions may be mimicked on the malware analysis computing device, as described above, and in some embodiments user actions may be mimicked on the malware analysis device as well as the virtual machine and/or the physical computing device. At the same time, other portions of the network that may be more vulnerable, such as the image installation server, may be protected from any adverse effects of the malware. In various embodiments, the malware analysis computing device's access to the network may be blocked or unblocked by a managed switch.

In this aspect, the administrative computing device then installs a first malware sample onto the malware analysis computing device in step 411 and then analyzes the behavior of the first malware sample on the malware analysis computing device in step 412. The analysis in these embodiments, since actually being performed on a "typical" physical machine, can advantageously analyze malware samples in the event new, virtual machine resistant malware variants also become responsive to the detection of secondary data source booting, such as the use of LiveCDs or Live USBs.

Additionally, use of the malware analysis device can provide for more substantive analysis both when the malware is installed and subsequent to the initial analysis. For example, a generated notification may alert an IT employee or professional that malware was detected on a virtual machine, or that there was a difference in behavior on the virtual machine and the physical computing device. Subsequently, if the same sample is analyzed on the malware analysis device, the IT employee or professional could directly monitor the installation and analysis.

In some embodiments, after analyzing the behavior of the malware sample on the malware analysis device, the administrative computing device causes the malware analysis computing device's access to the network to be unblocked and a malware-infected hard drive image may be copied from the malware analysis device to an image collection server. This embodiment provides an automatic preservation of the malware infection on a genuine physical device that may be used for subsequent analysis as necessary.

The descriptions above provide examples of the methods and/or method steps that may be performed in some embodiments. In other embodiments, the method may include additional combinations or substitutions of some or all of the steps, components and features described above. Moreover, additional and alternative suitable variations, features, aspects and steps for the method may be recognized by those skilled in the art given the benefit of this disclosure. For example, some embodiments relate to malware analysis on a physical computing device booted from a secondary boot source only, while others may include analysis on a virtual machine and/or a malware analysis computing device as described herein, either sequentially or in parallel. Other embodiments relate to analysis using a malware analysis computing device only, while others may include analysis on a virtual machine and/or a physical computing device as described herein, either sequentially or in parallel.

In some embodiments, a virtual machine and malware analysis device might not be utilized, and the methods discussed above may instead include an administrative computing device causing a physical computing device to be booted from a secondary boot source different from a primary boot source; the administrative computing device installing a first malware sample onto the physical computing device; analyzing, with the administrative computing device, the behavior of the malware sample on the physical computing device; and finally causing, with the administrative computing device, the physical computing device to be rebooted such that it may be rebooted from the secondary boot source so that it may be ready for subsequent malware analysis.

Other aspects of the disclosure relate to an apparatus. Any of the features or components discussed in the embodiments providing examples of the method aspects may be features of embodiments of the apparatus. Moreover, any of the steps of embodiments of the method aspects may be performed by the apparatus. In certain embodiments, the apparatus includes at least one computer processor, at least one non-transitory computer-readable medium, the medium having stored therein computer executable instructions, that when executed by the at least one computer processor, cause the apparatus to perform some or all of the actions described above, such as, for example, actions performed by the administrative computing device. Moreover, additional and alternative suitable variations, and features for the apparatus will be recognized by those skilled in the art given the benefit of this disclosure.

Other aspects of the disclosure relate to one or more non-transitory computer-readable media storing computer-readable instructions. In certain embodiments, the one or more non-transitory computer-readable media store computer-readable instructions that, when executed by at least one computing device, cause the at least one computing device to perform some or all of the actions described above, such as, for example, actions performed by the administrative computing device. Any of the features discussed in the embodiments providing examples of the method may be features of embodiments of the one or more non-transitory computer-readable media.

What is claimed is:
1. A method comprising:
   initializing, by an administrative computing device, a virtual machine;
   installing, by the administrative computing device, a first malware sample onto the virtual machine;
   analyzing, by the administrative computing device, the behavior of the first malware sample on the virtual machine to identify at least one virtual machine malware action;
   causing, by the administrative computing device, a physical computing device to be booted from a secondary boot source different from a primary boot source, the primary boot source being a hard disk on the physical computing device, wherein the physical computing device is a separate device from the administrative computing device, and wherein the physical computing device does not initialize a virtual machine after booting;
   installing, by the administrative computing device, the first malware sample onto the physical computing device;
   analyzing, by the administrative computing device, the behavior of the first malware sample on the physical computing device to identify at least one physical computing device malware action;
   determining, by the administrative computing device, based on the analyzing, whether the behavior of the first malware sample on the virtual machine was different from the behavior of the first malware sample on the physical computing device by comparing the at least one virtual machine malware action and the at least one physical computing device malware action;
   responsive to determining that the behavior of the first malware sample on the virtual machine was different from the behavior of the first malware sample on the physical computing device, generating, by the administrative computing device, a notification indicating the first malware sample behaved differently;
   restarting, by the administrative computing device, the virtual machine such that it is ready for subsequent malware analysis;
   causing, by the administrative computing device, the physical computing device to be rebooted using an IP-enabled power strip, wherein the physical computing device is configured to be rebooted from the secondary boot source such that it is ready for subsequent malware analysis;
   installing, by the administrative computing device, at least a second malware sample onto the physical computing device and the virtual machine;
   analyzing, by the administrative computing device, the behavior of the at least a second malware sample on the virtual machine;
   analyzing, by the administrative computing device, the behavior of the at least a second malware sample on the physical computing device;
   determining, by the administrative computing device, based on the analyzing, whether the behavior of the at least a second malware sample on the virtual machine was different from the behavior of the at least a second malware sample on the physical computing device; and responsive to determining that the behavior of the at least a second malware sample on the virtual machine was different from the behavior of the at least a second malware sample on the physical computing device, generating, by the administrative computing device, a notification indicating the at least a second malware sample behaved differently.

2. The method of claim 1, further comprising:

responsive to determining that the behavior of the first malware sample on the virtual machine was different from the behavior of the first malware sample on the physical computing device, causing, by the administrative computing device, a malware analysis computing device to be booted from a network, wherein the malware analysis computing device is configured to receive a base hard drive image from an image installation server when booted from the network;

causing, by the administrative computing device, the malware analysis computing device's access to the network to be blocked;

causing, by the administrative computing device, the malware analysis computing device to be rebooted from the base hard drive image;

installing, by the administrative computing device, the first malware sample onto the malware analysis computing device; and analyzing, by the administrative computing device, the behavior of the first malware sample on malware analysis computing device.

3. The method of claim 2, further comprising:

causing, by the administrative computing device, the malware analysis computing device's access to the network to be unblocked; and copying, by the administrative computing device, a malware-infected hard drive image from the malware analysis computing device to an image collection server.

4. The method of claim 1, wherein the secondary boot source is a LiveCD or a Bootable USB.

5. The method of claim 1, further comprising causing, by the administrative computing device, user actions to be mimicked on the virtual machine and on the physical computing device after the first malware sample is installed.

6. The method of claim 5, wherein an automation script is used to mimic user actions.

7. The method of claim 5, wherein the user actions are received from a remote user.

8. The method of claim 3, wherein the malware analysis computing device's access to the network is blocked or unblocked by a managed switch.

9. A method comprising:

initializing, by an administrative computing device, a virtual machine;

installing, by the administrative computing device, a first malware sample onto the virtual machine;

analyzing, by the administrative computing device, the behavior of the first malware sample on the virtual machine to identify at least one virtual machine malware action;

causing, by the administrative computing device, a physical computing to be booted from a secondary boot source different from a primary boot source, the primary boot source being a hard disk on the physical computing device, wherein the physical computing device is a separate device from the administrative computing device, and wherein the physical computing device does not initialize a virtual machine after booting;

installing, by the administrative computing device, the first malware sample onto the physical computing device;

analyzing, by the administrative computing device, the behavior of the first malware sample on the physical computing device to identify at least one physical computing device malware action;

determining, by the administrative computing device, based on the analyzing, whether the behavior of the first malware sample on the virtual machine was different from the behavior of the first malware sample on the physical computing device by comparing the at least one virtual machine malware action and the at least one physical computing device malware action;

responsive to determining that the behavior of the first malware sample on the virtual machine was different from the behavior of the first malware sample on the physical computing device, causing, by the administrative computing device, a malware analysis computing device to be booted from a network, wherein the malware analysis computing device is configured to receive a base hard drive image from an image installation server when booted from the network, and wherein the malware analysis computing device is a separate device from the administrative computing device and the physical computing device;

causing, by the administrative computing device, the malware analysis computing device's access to the network to be blocked;

causing, by the administrative computing device, the malware analysis computing device to be rebooted from the base hard drive image;

installing, by the administrative computing device, the first malware sample onto the malware analysis computing device;

analyzing, by the administrative computing device, the behavior of the first malware sample on malware analysis computing device;

restarting, by the administrative computing device, the virtual machine such that it is ready for subsequent malware analysis;

causing, by the administrative computing device, the physical computing device to be rebooted using an IP-enabled power strip, wherein the physical computing device is configured to be rebooted from the secondary boot source such that it is ready for subsequent malware analysis;

installing, by the administrative computing device, at least a second malware sample onto the physical computing device and the virtual machine;

analyzing, by the administrative computing device, the behavior of the at least a second malware sample on the virtual machine;

analyzing, by the administrative computing device, the behavior of the at least a second malware sample on the physical computing device; and determining, by the administrative computing device, based on the analyzing, whether the behavior of the at least a second malware sample on the virtual machine was different from the behavior of the at least a second malware sample on the physical computing device.

10. The method of claim 9, further comprising:
causing, by the administrative computing device, the malware analysis computing device's access to the network to be unblocked; and
copying, by the administrative computing device, a malware-infected hard drive image from the malware analysis computing device to an image collection server.

11. The method of claim 9, wherein the malware analysis computing device's access to the network is blocked or unblocked by a managed switch.

12. The method of claim 9, further comprising causing, by the administrative computing device, user actions to be mimicked on the malware analysis computing device after the first malware sample is installed.

13. The method of claim 12, wherein an automation script is used to mimic user actions.

14. The method of claim 12, wherein the user actions are received from a remote user.

15. The method of claim 9, wherein the secondary boot source is a LiveCD or a Bootable USB.

16. A method comprising:
initializing, by an administrative computing device, a virtual machine;
installing, by the administrative computing device, a first malware sample onto the virtual machine;
analyzing, by the administrative computing device, the behavior of the first malware sample on the virtual machine;
causing, by the administrative computing device, a physical computing device to be booted from a secondary boot source different from a primary boot source, the primary boot source being a hard disk on the physical computing device, wherein the physical computing device is a separate device from the administrative computing device, and wherein the physical computing device does not initialize a virtual machine after booting;
installing, by the administrative computing device, a first malware sample onto the physical computing device;
analyzing, by the administrative computing device, the behavior of the first malware sample on the physical computing device to identify at least one physical computing device malware action;
determining, by the administrative computing device, based on the analyzing, whether the behavior of the first malware sample on the virtual machine was different from the behavior of the first malware sample on the physical computing device by identifying whether the at least one physical computing device malware action occurred on the virtual machine;
causing, by the administrative computing device, the physical computing device to be rebooted using an IP-enabled power strip, wherein the physical computing device is rebooted from the secondary boot source such that it is ready for subsequent malware analysis;
restarting, by the administrative computing device, the virtual machine such that it is ready for subsequent malware analysis;
installing, by the administrative computing device, at least a second malware sample onto the physical computing device and the virtual machine;
analyzing, by the administrative computing device, the behavior of the at least a second malware sample on the virtual machine;
analyzing, by the administrative computing device, the behavior of the at least a second malware sample on the physical computing device; and
determining, by the administrative computing device, based on the analyzing, whether the behavior of the at least a second malware sample on the virtual machine was different from the behavior of the at least a second malware sample on the physical computing device.

17. The method of claim 16, wherein the secondary boot source is a LiveCD or a Bootable USB.

18. The method of claim 16, further comprising causing, by the computing device, and responsive to a determination that no malware action has been identified after a detection time period following installation of the first malware sample, user actions to be mimicked on the physical computing device.

19. The method of claim 18, wherein an automation script is used to mimic user actions.

20. The method of claim 18, wherein the user actions are received from a remote user.

* * * * *